Patented Oct. 20, 1942

2,299,168

UNITED STATES PATENT OFFICE 2,299,168

BRAZING LIGHT METALS

Mike A. Miller, New Kensington, Pa., assignor to Aluminum Company of America, Pittsburgh, Pa., a corporation of Pennsylvania No Drawing. Application July 30, 1940, Serial No. 348,549

9 Claims. (Cl. 148—26)

This invention relates to the art of joining a plurality of metallic members, and it is more particularly concerned with brazing light metal parts. The term, "light metal," as it is used hereinafter, is intended to embrace both commercially pure aluminum and magnesium, and alloys containing at least 50 per cent by weight of either metal.

Brazing, as generally understood in the art, consists of joining metal parts by fusing a lower melting point metal between them without an appreciable fusion of the parent metal. It is distinguished from welding, on the one hand, because there is substantially no melting of the parent metal, and it does not resemble soft soldering on the other hand because it is performed at higher temperatures and on different types of filler metal. In a brazing operation where a flux is used, the parts to be joined are usually first coated with flux and assembled with a piece of brazing metal between the juxtaposed parts or at the edge of the areas to be joined. The brazing or filler metal may alternatively be added as a powder, wire, strip, sheet, or it may take the form of a metal coating upon the parts being joined. Where large quantities of articles are to be brazed, the assembled articles are then put into a furnace or other heating medium which causes a fusion of the flux and of the joining or brazing metal. Brazing is to be distinguished from the customary soft soldering operation, which is conducted at much lower temperatures, where the molten solder is supplied to areas to be joined along with a flux, and the fluid substances are often worked over the area being soldered by a suitable tool. The soundness of the soldered joint may thus depend in part upon mechanical agitation of both the flux and solder, whereas in brazing one must rely solely on the behavior of the flux and molten metal apart from external agitation.

A satisfactory brazing flux should, in general, possess the following physical properties: It must flow at a temperature somewhat below the melting point of the brazing metal. It must adhere to or wet the surfaces of the metals being joined. It must facilitate the spreading and alloying of the fused brazing metal over the surfaces of the metallic parts to be joined. It should also remove any oxide coating or other adherent foreign matter present on the metal parts in order to establish a metal-to-metal contact between the brazing metal and the parts being joined but it should not appreciably attack the metal, and it should also protect the cleansed surface against re-oxidation. Finally, any residue of the flux remaining after completion of the joining should be readily removable. This flux residue, if not removed, is likely to cause corrosion of the metal and brazed joint upon continued exposure to a damp atmosphere or other like media with which the brazed article may come into contact.

It has not been possible heretofore to braze articles made from aluminum or magnesium or alloys wherein these metals predominated, chiefly because of the difficulty encountered in removing the adherent and resistant film of one oxide found on the surface of these metals. Further, a number of alloys that would be satisfactory as a joining material from the standpoint of resistance to corrosion have too high melting points to be used with soldering fluxes, while on the other hand, in many instances, the melting points of the alloys suitable for brazing are too low for successful use with known welding fluxes. The problem of removing the oxide film is more acute in brazing than in soldering since in soldering light metals both flux and solder are usually agitated by the soldering tool or by vaporization of copious amounts of volatile reaction products. This agitation aids in breaking up and removing the oxide film and permits the solder to come immediately into intimate contact with the light metal where the oxide has been removed. Such a procedure is not possible in the brazing operation because the fusion of the joining metal is usually effected in a furnace or other medium which precludes agitation with a tool. There the brazing flux must act of its own accord to remove completely the oxide coating; when this removal has been effected, the flux causes the molten brazing metal to spread evenly between and over the surfaces to be joined.

Soldering fluxes have been found to be unsuitable for brazing purposes. Many of them are unstable at the higher temperatures used in the brazing operation. That is, they either vaporize, decompose, or run away before the brazing temperature is reached. Other soldering fluxes are of the type known as reaction fluxes and contain relatively large amounts of heavy metal salts, zinc chloride for example. The heavy metal salts decompose with a resultant deposit of heavy metal which either serves as the solder or as an interfacial layer between the solder and metal surfaces being joined, or it may alloy with the solder and alter the properties of the solder. When brazing light metals, such deposition of heavy metal is undesirable because it weakens the joint and renders the joint more susceptible to corrosion.

It is an object of my invention to provide a method of brazing of light metal members. Moreover, it is an object of my invention to provide a brazing flux which, without external agitation, removes the oxide coating and any adherent foreign matter present on light metal surfaces with a very high degree of efficiency. Another object of my invention is to promote the spread of the molten brazing metal over the metallic parts to be joined by means of a flux which will cause the brazing metal to come into intimate contact with the surface of the metal being joined. Still another object is the provision of a flux that makes it possible to use as a filler material corrosion resistant alloys, such as aluminum or magnesium base alloys, at lower temperatures than prevail in welding operations. A further object is to provide a flux suitable for furnace brazing operations.

I have discovered that light metal members can be quickly and conveniently brazed by means of a suitable filler metal and an inorganic salt flux containing an alkali metal fluoride and less than 0.5 per cent of at least one halide of a metal below aluminum in the electromotive series of metals, other than zinc and cadmium, in a carrier or vehicle composed of two or more alkali metal chlorides. This flux is especially well adapted for use in brazing members fabricated from commercially pure aluminum or magnesium. I have found that this flux has a very efficient cleansing action on the surfaces to be brazed and removes any oxide film and adhering foreign matter, such as grease, without agitation by external means. By means of this flux it has been found possible to join light metal parts in a few minutes, the resulting joints being strong and sound. In the case of T-shaped joints, the brazing metal forms a well rounded fillet.

In my copending applications, Serial Nos. 348,545 and 348,546, filed July 30, 1940, I have described and claimed brazing fluxes which contain a zinc or cadmium halide along with alkali metal chlorides and a fluoride, the zinc content of said fluxes being less than about 7.7 per cent and the cadmium content less than about 9.8 per cent. Zinc and cadmium are principally distinguished from the other metals below aluminum in the electromotive series because they can be advantageously employed in much larger amounts in brazing fluxes. The amount of the other metals below aluminum in the electromotive series in a brazing flux for joining light metal members must be restricted to very small proportions if a successful brazed joint is to be obtained. If large proportions are employed an inferior joint or even no joint at all is produced. Because of the difference in behavior between zinc and cadmium on the one hand, and the other metals on the other hand, together with a similarity in behavior among the latter metals, they are regarded as a group of equivalent substances. This group is composed of manganese, chromium, iron, cobalt, nickel, tin, lead, copper, arsenic, bismuth, antimony, mercury, silver, palladium, platinum, and gold. Palladium, platinum, and gold salts are usually too costly to justify commercial use; mercury salts introduce a corrosion hazard if light metal members are being joined and the use of arsenic salts presents a serious poison hazard.

The amount of these metals that can be successfully used in a brazing flux should not exceed the amount occurring in 0.5 per cent of the halide. The proportion of the halides of these metals which may be used lies between 0.01 and 0.5 per cent by weight of the entire flux but 0.05 per cent is preferred as the lower limit and 0.05 to 0.3 per cent is the preferred range. Where two or more of these halides are employed, the total amount should not exceed about 0.5 per cent. The use of such small amounts of these metal halides is novel in the art of brazing light metal members, as far as I am aware. This addition is so small that there is virtually no deposition of the metallic component of the halide upon the light metal surface. The removal of the oxide coating from the light metal surface seems to be accomplished in part rather by the tendency of the metallic component of the halide to be deposited rather than from actual deposition thereof. I have found that at least 0.01 per cent of the halide is necessary to obtain the desired effect, but more than about 0.5 per cent is unnecessary for my purpose.

Despite the fact that they are added in relatively small amounts, these halide salts appear to aid in penetrating and removing the oxide film from the surface of the metal; in combination with the alkali metal fluoride, they provide a balanced action of preparing the metal surface and promoting the spread of the fused brazing metal. This is especially important where a large number of articles is brazed in a furnace and great uniformity of result is demanded.

The other components of this flux may be present in varying proportions. A satisfactory range for the alkali metal fluoride has been found to be about 1 to 15 per cent of the total weight of the flux, but I prefer to use from 2 to 8 per cent of this component. It has been found that at least 1 per cent of the fluoride must be present to obtain the proper cleansing of the metal surface, but more than 15 per cent raises the melting point beyond the range that can be used for brazing. Both the normal fluorides and acid fluorides of the alkali metals may be used in the flux, both being included in the term, alkali metal fluorides. If one or more of these normal fluorides are used, the total should not exceed about 15 per cent. In case the acid fluorides are used, the total should not exceed 30 per cent. More than this amount raises the melting point of the flux to too high a temperature for brazing. If normal fluorides and acid fluorides are used in combination, the total should not exceed about 30 per cent of which total the normal fluoride should not constitute more than 15 per cent.

The physical properties of the flux are in large part determined by the composition of the carrier or vehicle since this component generally constitutes at least 50 per cent by weight of the entire flux. The relative amounts of the constituents of the vehicle should be adjusted to provide the proper melting point for use with the particular metal being employed to form the joint, but the melting point should in no case exceed about 1180° F. if the melting point of the filler metal is 1200° F. or higher. If, on the other hand, the filler metal has a lower melting point, the composition of the flux should be adjusted in order to reduce the melting point of the flux to a correspondingly lower temperature. In other words, the melting point of the flux should always be lower than the melting point of the filler metal in order to insure proper action of the flux. Generally, fluxes which melt between 950° and 1100° F. will be satisfactory for brazing most light metal members. The carrier or vehicle serves to bring the active ingredients into contact with the metal to be joined and it further acts to carry away the oxide particles and other material which the flux has loosened from the surface of the metal. For brazing purposes, the alkali metal chlorides provide the most satisfactory carrier because of their stability, non-oxidizing properties, and the wide melting point ranges of their mixtures. The chlorides of sodium, potassium, and lithium constitute what are herein referred to as the alkali metal chlorides, and any two or all of them should be employed within the following approximate percentage ranges in terms of the weight of the entire flux:

|  | Per cent |
|---|---|
| NaCl | 5 to 60 |
| KCl | 5 to 60 |
| LiCl | 5 to 80 |

The total amount of the chlorides plus the other flux ingredients cannot, of course, exceed 100 per cent. This means that if the maximum amount of one ingredient is used, the amounts of the others must be correspondingly decreased.

A variety of brazing or filler metals may be used in forming brazed joints by the practice of this invention providing they have melting points below that of the metal being brazed, and that they further possess such other requisite properties as adherence to the parent metal by alloying therewith, strength, and resistance to corrosion. Generally the filler metal has the same base as the parent metal, and hence has a higher melting point than soft solders. Thus, the temperature at which the joint is formed generally lies between 950° F., or in any event, the melting point of the filler metal, and the temperature at which the parent metal begins to fuse. However, it is usually desirable to form the joint at a temperature giving suitable fluidity to the filler metal without approaching the fusion temperature of the parent metal too closely since at that temperature that metal is soft and easily deformed. In most instances it has been found that very satisfactory results are obtained by using aluminum base alloys as filler material for joining aluminum or aluminum base alloy members, and magnesium base alloys for brazing magnesium and magnesium base alloy parts. Some binary aluminum base alloys containing from 5 to 13 per cent silicon and 87 to 95 per cent aluminum which contains the usual impurities, have given very satisfactory results.

Through the use of a brazing flux of the composition recited herein and a suitable filler metal, it thus becomes possible to produce in all cases a strong brazed joint either between light metal members or between these metals and such other metals as iron and copper, for example. This flux is also well adapted for use with brazing or filler metals of varying composition, especially those alloys containing aluminum or magnesium as the predominant component. The flux compositions mentioned hereinabove have a melting point range which makes possible the utilization of corrosion resistant alloys as the brazing or filler metal. Heretofore the only fluxes which could be successfully employed with these corrosion resistant alloys were those having melting points so high as to restrict their utility to welding operations. By using the flux disclosed herein, it thus becomes possible to produce strong corrosion resistant joints in the ordinary furnace brazing operation as well as by other brazing methods.

As illustrative of particular embodiments of this invention, two preferred flux compositions are:

(1) 56% KCl, 36% LiCl, 8% NaF, 0.1% AgCl
(2) 55.8% KCl, 36% LiCl, 8% NaF, 0.3% SbCl₃

The approximate minimum brazing temperature which may be used with the fluxes of the illustrated compositions is 950° F., but by varying the proportion of the components of the carrier or vehicle, other similar fluxes may be prepared having different minimum brazing temperatures as the nature of the brazing alloy and the members being joined may demand.

Two examples may be cited of the manner in which aluminum and magnesium parts have been successfully brazed in the form of T-shaped joints. In one case two strips of commercially pure aluminum sheet were covered with the above mentioned (1) flux in the form of a water paste along the portions that were to be joined. They were then mounted in a jig to hold the pieces in an inverted T-shape position, and a wire of the brazing alloy (10% Si, 90% Al) was placed at the junction of the two strips. The entire assembly was then placed in a furnace and heated to 1125° F. for 10 minutes. Upon withdrawal of the assembly from the furnace and cooling to room temperature, it was found that the operation had resulted in the production of a sound joint. A symmetrical fillet of brazing metal had been formed on both sides of the joint and there was no visible deposition of heavy metal. The entire flux residue was readily washed away from the newly formed joint.

In a similar manner, two strips of magnesium were brazed by using the (2) flux mentioned above and a suitable magnesium base alloy filler metal. The two pieces of metal were painted with a thin water slurry of the flux along the portions of the strips that were to be joined, and then mounted in a jig in an inverted T-shape position. A wire of a suitable brazing alloy was placed along the portions to be joined. The entire assembly was then placed in a furnace and heated to 1100° F. for 10 minutes. Upon withdrawal of the assembly from the furnace, it was observed that this operation had resulted in the production of a sound well filleted joint.

The examples which have been given hereinabove are intended to illustrate my invention and not to restrict it or the appended claims.

Having thus described my invention, I claim:

1. A method of producing a brazed joint between metallic members at least one of which consists of a light metal, comprising effecting the brazing in the presence of an inorganic salt flux containing from 0.01 to 0.5 per cent of at least one halide of the group of metals below aluminum in the electromotive series, with the exception of zinc and cadmium, the total amount of said halides not exceeding about 0.5 per cent, said flux being adapted to remove the oxide film on the members with virtually no deposition of metal from the halides of the aforesaid group of metals.

2. A method of producing a brazed joint between metallic members at least one of which consists of a light metal, comprising effecting the brazing in the presence of an inorganic salt flux containing at least one alkali metal fluoride and from 0.01 to 0.5 per cent of at least one halide of the group of metals below aluminum in the electromotive series, with the exception of zinc and cadmium, the total amount of said halides not exceeding about 0.5 per cent, said flux being adapted to remove the oxide film on the members with virtually no deposition of metal from the halides of the last named group of metals.

3. A method of producing a brazed joint between light metal members comprising effecting the brazing in the presence of an inorganic salt flux containing from 0.01 to 0.5 per cent of at least one halide of the group of metals below aluminum in the electromotive series, with the exception of zinc and cadmium, the total amount of said halides not exceeding about 0.5 per cent, said flux being adapted to remove the oxide film on the members with virtually no deposition of metal from the halides of the aforesaid group of metals.

4. A method of furnace brazing light metal members comprising effecting the brazing in the presence of an inorganic salt flux containing from 0.01 to 0.5 per cent of at least one halide of the group of metals below aluminum in the electromotive series, with the exception of zinc and cadmium, the total amount of said halides not exceeding about 0.5 per cent, said flux being adapted to remove the oxide film on the members with virtually no deposition of metal from the halides of the aforesaid group of metals.

5. A method of producing a brazed joint between metallic members at least one of which consists of a light metal, comprising effecting the brazing in the presence of an inorganic salt flux containing from 1 to 30 per cent of at least one alkali metal fluoride but not more than 15 per cent of a normal fluoride, at least two alkali metal chlorides of the group consisting of sodium chloride, potassium chloride, and lithium chloride in the proportions of 5 to 60 per cent sodium chloride, 5 to 60 per cent potassium chloride and 5 to 80 per cent lithium chloride, and from 0.01 to 0.5 per cent of at least one halide of the group of metals below aluminum in the electromotive series, with the exception of zinc and cadmium, the total amount of said halides not exceeding about 0.5 per cent, said flux being adapted to remove the oxide film on the members with virtually no deposition of metal from the halides of the last named group of metals below aluminum in the electromotive series.

6. A method of producing a brazed joint between light metal members comprising effecting the brazing in the presence of an inorganic salt flux containing from 1 to 30 per cent of at least one alkali metal fluoride but not more than 15 per cent of a normal fluoride, at least two alkali metal chlorides of the group consisting of sodium chloride, potassium chloride, and lithium chloride in the proportions of 5 to 60 per cent sodium chloride, 5 to 60 per cent potassium chloride and 5 to 80 per cent lithium chloride, and from 0.05 to 0.3 per cent of at least one halide of the group of metals below aluminum in the electromotive series, with the exception of zinc and cadmium, the total amount of said halides not exceeding about 0.5 per cent, said flux being adapted to remove the oxide film on the members with virtually no deposition of metal from the halides of the last named group of metals below aluminum in the electromotive series.

7. A flux for brazing light metals containing from 1 to 30 per cent of at least one alkali metal fluoride but not more than 15 per cent of a normal fluoride, at least two alkali metal chlorides of the group consisting of sodium chloride, potassium chloride, and lithium chloride in the proportions of 5 to 60 per cent sodium chloride, 5 to 60 per cent potassium chloride and 5 to 80 per cent lithium chloride, and from 0.01 to 0.5 per cent of at least one halide of the group of metals below aluminum in the electromotive series, with the exception of zinc and cadmium, the total amount of said halides not exceeding about 0.5 per cent, said flux being characterized by its ability to remove the oxide film on the members with virtually no deposition of metal from the halides of the last named group of metals below aluminum in the electromotive series.

8. A flux for brazing light metals containing from 1 to 15 per cent of at least one normal alkali metal fluoride, at least two alkali metal chlorides of the group consisting of sodium chloride, potassium chloride, and lithium chloride in the proportions of 5 to 60 per cent sodium chloride, 5 to 60 per cent potassium chloride and 5 to 80 per cent lithium chloride, and from 0.01 to 0.5 per cent of at least one halide of the group of metals below aluminum in the electromotive series, with the exception of zinc and cadmium, the total amount of said halides not exceeding about 0.5 per cent, said flux being characterized by its ability to remove the oxide film on the members with virtually no deposition of metal from the halides of the last named group of metals below aluminum in the electromotive series.

9. A flux for brazing light metals containing from 1 to 15 per cent of at least one normal alkali metal fluoride, at least two alkali metal chlorides of the group consisting of sodium chloride, potassium chloride, and lithium chloride in the proportions of 5 to 60 per cent sodium chloride, 5 to 60 per cent potassium chloride and 5 to 80 per cent lithium chloride, and from 0.05 to 0.3 per cent of at least one halide of the group of metals below aluminum in the electromotive series, with the exception of zinc and cadmium, the total amount of said halides not exceeding about 0.5 per cent, said flux being characterized by its ability to remove the oxide film on the members with virtually no deposition of metal from the halides of the last named group of metals below aluminum in the electromotive series.

MIKE A. MILLER.